(12) United States Patent  
Lira Rueda (10) Patent No.: US 12,451,219 B2
(45) Date of Patent: Oct. 21, 2025

(54) LABORATORY SYSTEM (71) Applicant: Roche Diagnostics Operations, Inc., Indianapolis, IN (US)

(72) Inventor: Javier Lira Rueda, Abrera (ES)

(73) Assignee: ROCHE DIAGNOSTICS OPERATIONS, INC., Indianapolis, IN (US)

( * ) Notice: Subject to any disclaimer, the term of this patent is extended or adjusted under 35 U.S.C. 154(b) by 707 days.

(21) Appl. No.: 17/751,897

(22) Filed: May 24, 2022

(65) Prior Publication Data

US 2022/0392586 A1    Dec. 8, 2022

(30) Foreign Application Priority Data

Jun. 3, 2021  (EP) ..................................... 21382497

(51) Int. Cl.
*G16H 10/40*  (2018.01)
*G01N 35/00*  (2006.01)

(52) U.S. Cl.
CPC ....... *G16H 10/40* (2018.01); *G01N 35/00732* (2013.01); *G01N 2035/00881* (2013.01)

(58) Field of Classification Search
CPC .. G16H 10/40; G16H 40/40; G01N 35/00732; G01N 2035/00881; H04L 69/08; H04L 69/18
See application file for complete search history.

(56) References Cited

U.S. PATENT DOCUMENTS 8,719,053 B2 *  5/2014  Showalter ............. G16H 10/40
                                                            705/2
9,268,619 B2 *  2/2016  Rivkin .................... G06F 9/541
(Continued)

FOREIGN PATENT DOCUMENTS

JP    2007-082888 A    4/2007
JP    2013-178825 A    9/2013
JP    2019-204537 A    11/2019

OTHER PUBLICATIONS

Notice of Reasons for Refusal drafted Feb. 2, 2024, for Japanese Patent Application No. 2022-090405, 4 sheets including English translation.

(Continued)

*Primary Examiner* — Michael Jared Walker
(74) *Attorney, Agent, or Firm* — KATTEN MUCHIN ROSENMAN LLP (57) ABSTRACT

A method is presented. The method comprises establishing, by a communication module, a connection between an instrument data processing module and a laboratory management module via a network; identifying, by a protocol identification module, an instrument communication protocol supported by the instrument data processing module and a laboratory management module communication protocol supported by the laboratory management module; and transmitting, by the communication module, messages from the instrument data processing module to the laboratory management module in the instrument communication protocol when it is determined that the instrument communication protocol is the same as or compatible with the laboratory management module communication protocol and/or transmitting, by the communication module, messages from the laboratory management module to the instrument data processing module in the laboratory management module communication protocol when it is determined that the laboratory management module communication protocol is the same as or compatible with the instrument communication protocol.

17 Claims, 4 Drawing Sheets

(56) References Cited

U.S. PATENT DOCUMENTS

| | | | |
|---|---|---|---|
| 10,664,486 B2* | 5/2020 | Fonesca | G06F 16/2471 |
| 10,771,275 B2* | 9/2020 | Tappeiner | H04L 12/2856 |
| 12,111,640 B2* | 10/2024 | Pfaffmann | G05B 19/4188 |
| 2002/0138301 A1* | 9/2002 | Karras | G06Q 40/08 |
| | | | 705/2 |
| 2004/0054773 A1* | 3/2004 | Funke-Schaeff | H04L 67/12 |
| | | | 709/224 |
| 2004/0172298 A1* | 9/2004 | Cross | G16H 10/40 |
| | | | 705/2 |
| 2006/0088940 A1* | 4/2006 | Feingold | G01N 35/00732 |
| | | | 422/67 |
| 2006/0178776 A1* | 8/2006 | Feingold | G01N 35/0092 |
| | | | 700/245 |
| 2010/0042440 A1* | 2/2010 | Joao | G16H 40/67 |
| | | | 705/2 |
| 2013/0145046 A1* | 6/2013 | Rivkin | G06F 9/541 |
| | | | 709/246 |
| 2017/0364652 A1* | 12/2017 | Lo Priore | G16H 10/40 |
| 2019/0214128 A1* | 7/2019 | Colister | A61B 5/0015 |
| 2019/0279777 A1* | 9/2019 | Conlin | G16H 10/40 |
| 2020/0374359 A1* | 11/2020 | Kononyuk | G16H 40/40 |

OTHER PUBLICATIONS

European Search Report issued Nov. 7, 2021 in Application No. 21382497.2, 2 pp.

\* cited by examiner

LABORATORY SYSTEM

CROSS-REFERENCE TO RELATED APPLICATIONS

This application claims priority to EP 21382497.2, filed Jun. 3, 2021, which is hereby incorporated by reference.

BACKGROUND

The present disclosure generally relates to a laboratory system, a laboratory communications engine, a laboratory instrument, a computer-implemented method, a non-transitory computer readable storage medium, and a laboratory.

Laboratory information management systems (LIMS) also referred to as laboratory information systems (LIS) or laboratory management systems (LMS) are software-based solutions, which support laboratory operation. For example, these software systems facilitate workflow and data tracking management as well the tracking and management of samples within the laboratory.

For example, in a laboratory comprising a large number of laboratory instruments, these instruments will report results to an LIS for further distribution to clients or clinicians. Similarly, the instruments will receive instructions from the LIS as to how a sample is to be processed or other workflow related instructions.

There is a desire that the LIS and laboratory instruments communicate in an efficient manner and, for that reason, laboratory middleware is often deployed. Laboratory middleware is provided as a software-based intermediately between each laboratory instrument and the LIS. The laboratory middleware can help ensure that an LIS from one provider is operable with instruments from another provider.

The laboratory middleware will often utilize standard communication protocols (e.g., Health level 7 protocol or the ASTM-LIS2-A2 protocol) to provide interoperability between instruments and the LB. These standards, however, are unable to model the specific needs or capabilities of a given instrument. Manufacturers of instruments therefore will make their own interpretation of the standard to include as much relevant information to the LB as possible, under restrictions from the standard communication protocol syntax. The instrument, or laboratory middleware, will then need to convert any messages to be transmitted to the LIS (or vice versa) from an internal communication protocol to one of these standard communication protocols supported by the receiver of the message.

SUMMARY

According to the present disclosure, a laboratory system and method are presented. The laboratory system can comprise a laboratory instrument, a laboratory management module configured to receive and process data from the laboratory instrument and to generate one or more messages to be transmitted to an instrument data processing module according to a laboratory management module communication protocol, wherein the instrument data processing module is configured to obtain and process analytical data from the laboratory instrument and to generate one or more messages to be transmitted to the laboratory management module according to an instrument communication protocol, a protocol identification module configured to identify communication protocol(s) supported by the laboratory management module and communication protocol(s) supported by the instrument data processing module, and a message conversion module configured to convert the or each message to be transmitted from one of the instrument data processing module and the laboratory management module into a communication protocol supported by the other of the laboratory management module and instrument data processing module when it is determined that either the laboratory management module communication protocol is incompatible with the communication protocol(s) supported by the instrument data processing module or the instrument communication protocol is incompatible with the communication protocol(s) supported by the laboratory management module, wherein the instrument data processing module is configured, when it is determined that the instrument communication protocol is supported by the laboratory management module, to transmit its generated message(s) to the laboratory management module according to the instrument communication protocol and/or the laboratory management module is configured, when it is determined that the laboratory management module communication protocol is supported by the instrument data processing module, to transmit its generated message(s) to the instrument data processing module according to the laboratory management module communication protocol.

Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

Accordingly, to a first aspect, embodiments of the present disclosure can provide a laboratory system comprising a laboratory instrument and a laboratory management module configured to receive and process data from the laboratory instrument and to generate one or more messages to be transmitted to an instrument data processing module according to a laboratory management module communication protocol. The instrument data processing module can be configured to obtain and process analytical data from the laboratory instrument and to generate one or more messages to be transmitted to the laboratory management module according to an instrument communication protocol. The laboratory system can further comprise a protocol identification module configured to identify communication protocol(s) supported by the laboratory management module and communication protocol(s) supported by the instrument data processing module and a message conversion module configured to convert the or each message to be transmitted from one of the instrument data processing module and the laboratory management module into a communication protocol supported by the other of the laboratory management module and instrument data processing module when it is determined that either the laboratory management module communication protocol is incompatible with the communication protocol(s) supported by the instrument data processing module or the instrument communication protocol is incompatible with the communication protocol(s) supported by the laboratory management module. The instrument data processing module can be configured, when it is determined that the instrument communication protocol is supported by the laboratory management module, to transmit its generated message(s) to the laboratory management module according to the instrument communication protocol and/or the laboratory management module can be configured, when it is determined that the laboratory management module communication protocol is supported by the instrument data processing module, to transmit its generated message(s) to the instrument data processing module according to the laboratory management module communication protocol.

Such a system can reduce the computational load when messages are transmitted from a laboratory instrument to a laboratory management module, or vice versa, and, moreover, it can increase the apparent functionality of the laboratory instrument to the laboratory management module.

Optional features can now be set out. These can be applicable singly or in any combination with any aspect of the present disclosure.

The protocol identification module and the message conversion module may be located within the laboratory management module, the laboratory instrument, or an intermediary device connected to both the laboratory management module and the laboratory instrument. The protocol identification module and the message conversion module may be implemented as computer-software running on any one of the same.

The laboratory management module may form a part of a laboratory information system or may be middleware connected to the laboratory management system.

The instrument data processing module may be configured to obtain and process analytical data from the laboratory instrument using an instrument data model. The message conversion module may be further configured to convert the analytical data from the instrument data model into a data model compatible with the communication protocol(s) supported by the laboratory management module when it is determined that the instrument data model is incompatible with the communication protocol(s) supported by the laboratory management module. The instrument data processing module may be configured to transmit the analytical data obtained from the laboratory instrument to the laboratory management module in the instrument data model when it is determined that the instrument data model is supported by the laboratory management module.

The laboratory instrument may be one of a pre-analytics instrument, an analyzer, or a post-analytic instrument. There may be a plurality of laboratory instruments.

The protocol identification module may be configured to receive from either of, or both of, the laboratory management module and the instrument data processing module a status indicator that can include an indication of the one or more communication protocols supported by the laboratory management module, the instrument data processing module, or both.

The laboratory management module, the instrument data processing module, or the protocol identification module may be configured to send an enquiry message requesting one or both of the laboratory management module or the instrument data processing module reply with an indication of the communication protocol(s) it supports.

The message conversion module may be configured to convert form the instrument communication protocol or the laboratory management module communication protocol into any one of: a health level 7 (HL7) protocol; an ASTM-LIS2-A2 protocol; a POCT1-A protocol; or a fast healthcare interoperability resources (FHIR) protocol.

The laboratory instrument may include a user input module and the instrument data processing module may be configured to establish a connection to the laboratory management module when prompted to do so via the user input module.

The message conversion module may be configured to convert the or each message to be transmitted from the instrument data processing module to the laboratory management module into a communication protocol supported by the laboratory management module, when it is determined that the instrument communication protocol is incompatible with the communication protocol(s) supported by the laboratory management module and convert the or each message to be transmitted from the laboratory management module to the instrument data processing module into a communication protocol supported by the instrument data processing module, when it is determined that the laboratory management module communication protocol is incompatible with the communication protocol(s) supported by the instrument data processing module.

In a second aspect, embodiments of the present invention can provide a laboratory communications engine comprising a communication module configured to establish a connection between an instrument data processing module and a laboratory management module via a computer network, a protocol identification module configured to identify a communication protocol supported by the instrument data processing module and a communication protocol supported by the laboratory management module, and a message conversion module configured to convert the messages to be transmitted from one of the instrument data processing module and the laboratory management module into a communication protocol supported by the other of the laboratory management module and instrument data processing module when it is determined that either the communication protocol supported by the laboratory management module is incompatible with the communication protocol supported by the instrument data processing module or the communication protocol supported by the instrument data processing module is incompatible with the communication protocol supported by the laboratory management module. The communication module can be configured, when it is determined that the instrument communication protocol is supported by the laboratory management module, to transmit its generated message(s) to the laboratory management module according to the instrument communication protocol and/or the communication module can be configured, when it is determined that the laboratory management module communication protocol is supported by the instrument data processing module, to transmit its generated message(s) to the instrument data processing module according to the laboratory management module communication protocol.

Such a communications engine can reduce the computational load when messages are transmitted from a laboratory instrument to a laboratory management module, or vice versa, and can further increase the apparent functionality of the laboratory instrument to the laboratory management module.

The laboratory communications engine may be installed within a laboratory instrument, the laboratory management module, or an intermediary device connected to a laboratory instrument and the laboratory management module.

The laboratory communications engine may be implemented as computer software, and may be stored in a non-transitory computer readable storage medium containing machine executable instructions which, when executed on a processor, implement the communication module, the protocol identification module, and the message conversion module. By implement, it may be meant that software providing the functions described can be installed and operated.

The protocol identification module may be configured to receive from either the laboratory management module or the instrument data processing module, or both, a status indicator that can include an indication of one or more communication protocols supported by the laboratory management module, the instrument data processing module, or both.

The communication module may be configured to send an enquiry message to either the laboratory management module or the instrument data processing module, or both, requesting that it reply with an indication of the communication protocol(s) it supports.

In a third aspect, embodiments of the present disclosure can provide a laboratory instrument, connectable to a laboratory management module, the laboratory instrument comprising an instrument data processing module configured to obtain and process analytical data and to generate messages to be transmitted to the laboratory management module according to an instrument communication protocol, a protocol identification module configured to identify communication protocol(s) supported by the laboratory management module, and a message conversion module configured to convert the messages to be transmitted to the laboratory management module into a communication protocol supported by the laboratory management module when it is determined that the instrument communication protocol is incompatible with the communication protocol(s) supported by the laboratory management module. The instrument data processing module can be configured to transmit generated messages to the laboratory management module in the instrument communication protocol when it is determined that the instrument communication protocol is the same as or compatible with the laboratory management module communication protocol.

Such a laboratory instrument engine can reduce the computational load when messages are transmitted from a laboratory instrument to a laboratory management module, or vice versa, and can further increase the apparent functionality of the laboratory instrument to the laboratory management module.

The laboratory instrument may contain any one, or any combination insofar as they are compatible, of the optional features as set out with reference to the first or second aspects.

In a fourth aspect, embodiments of the present disclosure can provide a computer-implemented method comprising establishing, by a communication module, a connection between an instrument data processing module and a laboratory management module via a computer network, identifying, by a protocol identification module, an instrument communication protocol supported by the instrument data processing module and a laboratory management module communication protocol supported by the laboratory management module, and transmitting, by the communication module, messages from the instrument data processing module to the laboratory management module in the instrument communication protocol when it is determined that the instrument communication protocol is the same as or compatible with the laboratory management module communication protocol and/or transmitting, by the communication module, messages from the laboratory management module to the instrument data processing module in the laboratory management module communication protocol when it is determined that the laboratory management module communication protocol is the same as or compatible with the instrument communication protocol.

Such a computer-implemented method can reduce the computational load when messages are transmitted from a laboratory instrument to a laboratory management module, or vice versa, and can further increase the apparent functionality of the laboratory instrument to the laboratory management module.

The computer-implemented method may contain any one, or any combination insofar as they are compatible, of the optional features as set out with reference to the first or second aspects.

In a fifth aspect, embodiments of the present disclosure can provide a non-transitory computer readable storage medium containing machine executable instructions which, when executed on one or more processors, can cause the one or more processors to perform the method of the fourth aspect.

In a sixth aspect, embodiments of the present disclosure can provide a laboratory, including the communications engine of the second aspect. The laboratory management module can be connected to a plurality of laboratory instruments as set out in the third aspect.

Further aspects of the present disclosure can provide a computer program comprising code which, when run on a computer, can cause the computer to perform the method of the fourth aspect; a computer readable medium storing a computer program comprising code which, when run on a computer, can cause the computer to perform the method of the first aspect, and a computer system programmed to perform the method of the fourth aspect.

Figure 1:
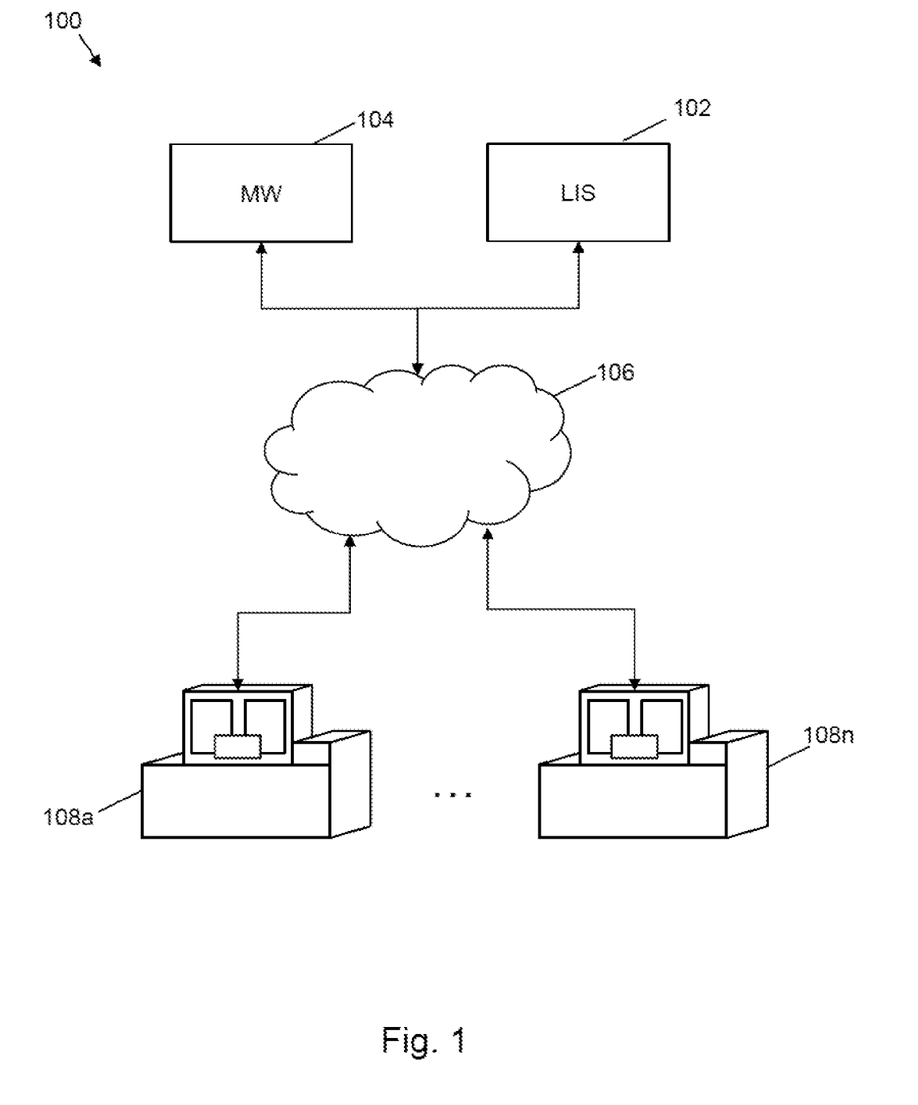
FIG. 1 illustrates a schematic view of a laboratory system according to an embodiment of the present disclosure.

Referring initially to FIG. 1, FIG. 1 is a schematic view of a laboratory system 100. The laboratory system can include a laboratory information system (LIS) 102 connected to middleware (MW) 104. Both the LIS 102 and MW 104 can be implementable as software packages running on one or more computers. They may be connected either by virtue of running on the same computer (physical or virtual) or may be connected via a network when located on distinct computers. In the example shown in FIG. 1, the LIS 102 and MW 104 can be implemented on separate computers and connected to one another via network 106. The LIS 102 and MW 104 can be examples of a laboratory management module in that they may contain software, which can provide the functions of the laboratory management module.

The network 106 can also facilitate connection between the LIS 102, MW 104, and one or more laboratory instruments 108a to 108n. The laboratory instruments 108a-n may be, for example, pre-analytics instruments, analyzers, or post-analytic instruments. For example, one or more of the laboratory instruments 108a-n may be Cobas® 6000 analyzers configured to perform measurements of proteins, enzymes, substrates and electrolytes, direct antiglobulin tests, and therapeutic drug monitoring, or Cobas® 6800/Cobas® 8800 for measurement of nucleic acids, e.g., of pathogens. In use, the LIS 102 can communicate with the laboratory instruments 108a-n in order to order tests, monitor consumables, receive error codes, receive status indicators, receive test results, and the like. This communication can either be directly between the LIS 102 and a given laboratory instrument 108a-n, or via the middleware 104. The middleware 104 can typically enhance the functions available to the LIS 102 and can operate as an intermediary between the laboratory instruments 108a-n and the LIS 102.

In use, the LIS 102 and/or MW 104 (now referred to as the laboratory management module), can be configured to receive and process data from the or each laboratory instrument 108. It can be further configured to generate one or more messages to be transmitted to an instrument data processing module (discussed in detail below), which in this example can be located in a respective laboratory instrument. In some examples, the instrument data processing module can be located externally to but connected with at least one laboratory instrument 108. These messages, from the laboratory management module, can be generated according to a laboratory management module communication protocol.

The or each instrument data processing module, located in a respective instrument 108a, can be configured to obtain and process analytical data from the laboratory instrument. The instrument data processing module(s) can also be configured to generate one or more messages to be transmitted to the laboratory management module according to an instrument communication protocol. These messages can contain, for example, the analytical data obtained and processed from the laboratory instrument.

The system can also comprises a protocol identification module (PIM). As will be discussed in detail below, the PIM can be implemented as software and can be installed on any one of: the LIS 102, the MW 104, or a laboratory instrument 108. The protocol identification module can be configured to identify the communication protocol(s) supported by the laboratory management module and the communication protocol(s) supported by the instrument data processing module. This can be performed, for example, by requesting that the laboratory management module and/or instrument data processing module transmit to the PIM a list of all communication protocols supported thereby. This request can be sent in the form of an enquiry message. In some examples, the laboratory management module and instrument data processing module may be configured to transmit status indicators to the PIM (e.g., without prompt). The status indicators can include an indication of the one or more protocol(s) supported.

The system can also comprises a message conversion module (MCM). As will be discussed in detail below, the MCM can be implemented as software and can be installed on any one of: the LIS 102, the MW 104, or a laboratory instrument 108. The MCM can be configured to convert messages to be sent from the laboratory management module to the instrument data processing module, or vice versa, when it is determined that the messages are in an incompatible communication protocol. For example, where the laboratory management module intends to transmit a message to the instrument data processing module according to the health level 7 protocol, but it has been determined (for example by the PIM, but this determination could be made by the MCM or the laboratory management module itself) that the instrument data processing module is incompatible with this communication protocol, the MCM can convert the message into a communication protocol which is compatible with the instrument data processing module. These converted messages can then be transferred via the network from the sender to the receiver.

Whereas, when it has been determined that the laboratory management module communication protocol is supported by the instrument data processing module (or vice versa) messages can be transmitted directly from one to the other without conversion. For example, where the laboratory management module intends to transmit a message to the instrument processing module according to a laboratory management module communication protocol and the PIM has ascertained that the instrument data processing module supports this protocol, the communication can happen directly and without conversion across the network.

Figure 2:
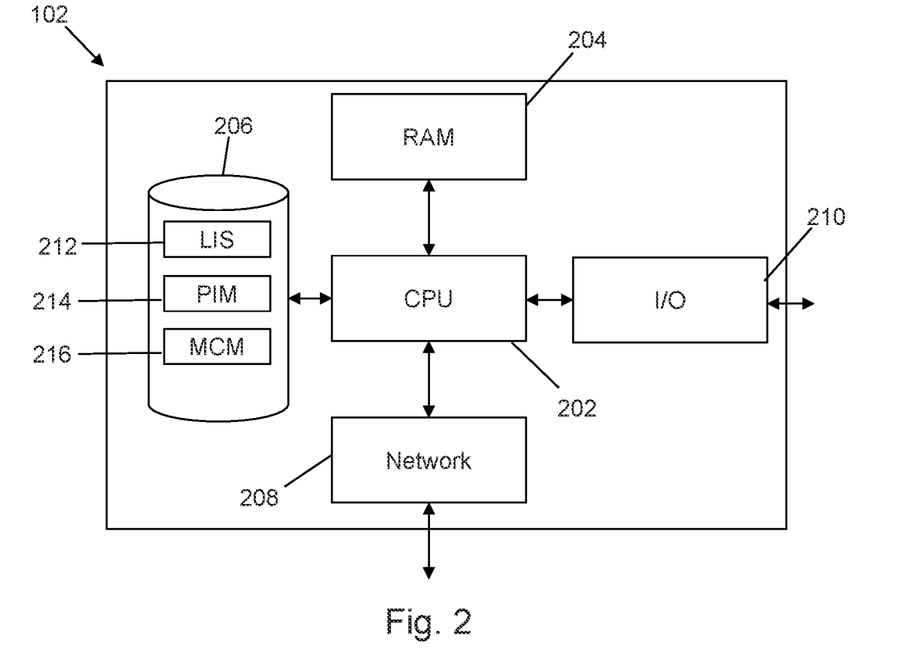
FIG. 2 illustrates a schematic view of the laboratory information system according to an embodiment of the present disclosure.

FIG. 2 is a schematic view of the laboratory information system (LIS) 102. The laboratory information system in this example includes a CPU or processing unit 202, which can be connected to random access memory (RAM) or other volatile, short-term memory 204. In use, the processor 202 can cause computer software to be read from non-volatile storage 206 and loaded into the volatile memory for execution, in a manner known per se in the art. The processing unit 202 can also be connected to input/output (I/O) interface(s) 210, which can include, for example, a human-machine interface such a keyboard and mouse, displays, and the like. The human-machine interface can be used, for example, to establish a connection between the LIS 102 and the one or more laboratory instruments. Further, the CPU 202 can be connected to network interface 208, which can enable communication over network 106 between the LIS 102 and other elements of the system.

In this example, the non-volatile storage 206 can include the following software: LIS software 212; the protocol identification module 214; and the message conversion module 216. The LIS software 212 can allow the LIS 102 to operate as an LIS, and so can include the type of functionality expected from an LIS (e.g., ability to view workflows, order test, review results and the like.). The protocol identification module 214 and message conversion module 216 can allow the processor 202 to perform functions of the PIM and MCM as discussed above. In other examples, where the PIM and MCM are located elsewhere in the system, the non-volatile storage 206 may not contain the PIM and MCM. Alternatively, it may include further copies of the PIM and MCM, which can operate on messages to be sent from the LIS 102.

Figure 3:
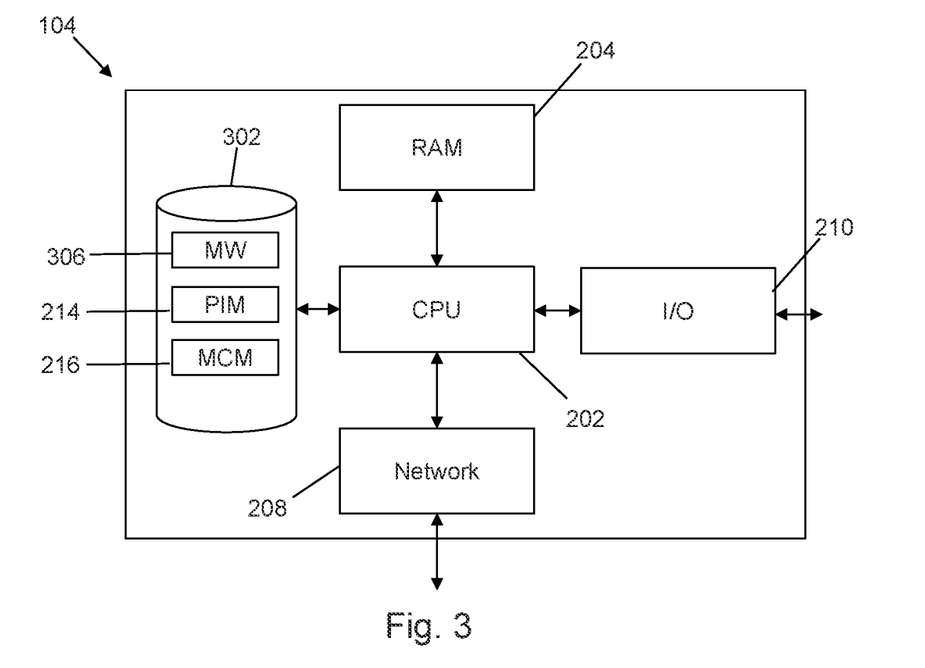
FIG. 3 illustrates a schematic view of the middleware according to an embodiment of the present disclosure.

FIG. 3 is a schematic view of the middleware (MW) 104. The middleware 104 can share features in common with the LIS 102, and so like features are indicated by like reference numerals. Specifically, the middleware 104 also includes a processor 202, volatile memory 204, network interface 208, and I/O interface(s) 210. It can differ in the software, which is contained in the non-volatile storage 302. Here, the non-volatile storage 302 of the middleware 104 can contain MW software 306, and the PIM 214 and MCM 216. The MW software 306 can allow the MW 104 to operate as middleware, and so includes the type of functionality expected from middleware (e.g., management of instruments and provision of data to an LIS). The protocol identification module 214 and message conversion module 216 can allow the processor 202 to perform the functions of the PIM and MCM as discussed above. In other examples, where the PIM and MCM are located elsewhere in the system, the non-volatile storage 302 may not contain the PIM and MCM. Alternatively, it may include further copies of the PIM and MCM, which can operate on messages to be sent from the MW 104.

Figure 4:
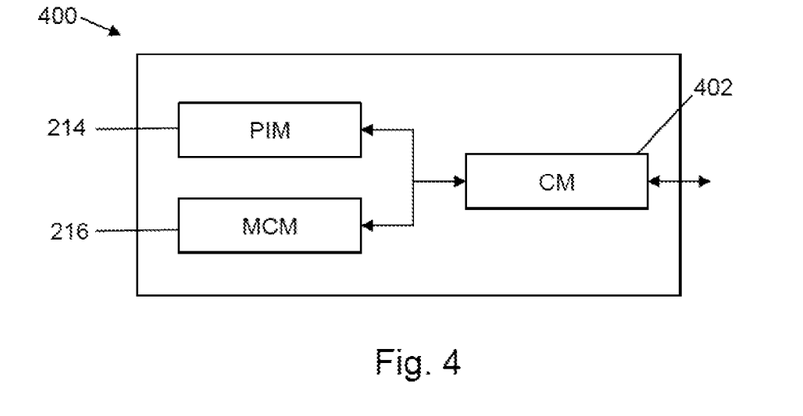
FIG. 4 illustrates a schematic view of a laboratory communications engine according to an embodiment of the present disclosure.

FIG. 4 is a schematic view of a laboratory communications engine 400. The laboratory communications engine 400 can be a collection of software modules, which can be operable on one or more computers. The laboratory communications engine 400 can include a communication module 402, which can be configured to establish a connection between an instrument data processing module (e.g., one in a laboratory instrument) and a laboratory management module (e.g., the LIS 102 and/or MW 104) via a computer network. The laboratory communications engine 400 can also include a protocol identification module 214 as discussed previously, as well as a message conversion module 216 also as discussed previously. The laboratory communications engine 400 can be installable on the LIS 102, MW 104, the laboratory instrument 108, an intermediary (not shown) connected between the LIS 102 or MW 104 and the laboratory instrument 108, or on a virtual computing network (e.g., a cloud computing space).

Figure 5:
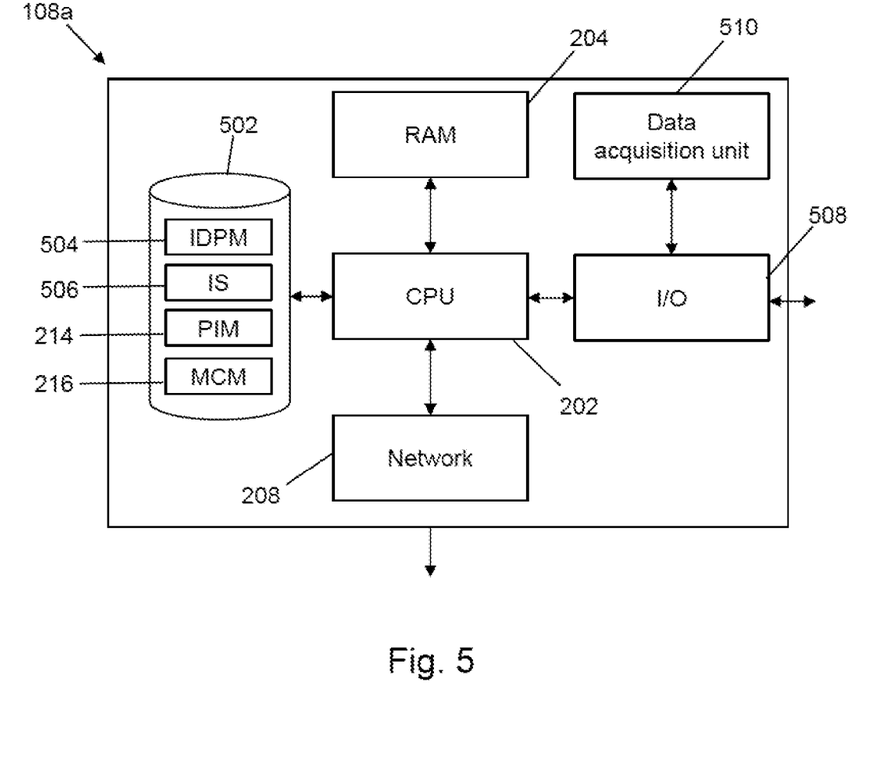
FIG. 5 illustrates a schematic view of a laboratory instrument according to an embodiment of the present disclosure.

FIG. 5 is a schematic view of a laboratory instrument 108a. The laboratory instrument 108a can include similar elements to the LIS 102 and MW 104, in that it can include a processing unit 202, which can be connected: volatile memory 204; I/O interfaces 508; network interface 208; and non-volatile storage 502. However, the laboratory instrument 108a can also include a data acquisition unit 510, which can be connected to the I/O interfaces 508. The data acquisition unit 510 can vary dependent on what specific function the laboratory instrument is to perform but will generally obtain raw measurement data. For example, where the laboratory instrument 108a is a polymerase chain reaction analyzer, the data acquisition unit 510 may obtain raw measurement data from which a concentration or amount of target DNA can be derived. This information can be transferred, via the I/O interface 508 to processing unit 202. The I/O interfaces 508 can also include one or more human-machine interfaces, e.g., a display, a keyboard, a mouse, and the like. The human-machine interface can be used, for example, to establish a connection between the laboratory instrument 108a and the LIS 102 and/or MW 104.

The non-volatile storage 502 of the laboratory instrument 109a can also include different software to the MW 104 and LB 102. In this example, the non-volatile storage 502 of the laboratory instrument 1098a can include the instrument data processing module (IDPM) 504 discussed above; instrument software (IS) 506; the protocol identification module (PIM) 214 discussed above; and the message conversion module (MCM) 216 discussed above. In other examples, where the PIM and MCM are located elsewhere in the system, the non-volatile storage 502 may not contain the PIM and MCM. Alternatively, it may include further copies of the PIM and MCM, which can operate on messages to be sent from the IDPM 504. The instrument software 506 can allow the laboratory instrument 108a to perform the functionality of a laboratory instrument (e.g., performing tests, retrieving data from the data acquisition unit 510, receiving instructions via the network or via a local human-machine interface). The instrument data processing module 504, as discussed previously, can be configured to obtain and process analytical data from the laboratory instrument (e.g., data from the data acquisition unit 510) and to generate one or more messages to be transmitted to the laboratory management module according to the instrument communication protocol.

The IDPM 504 may also be configured to obtain and process analytical data from the data acquisition unit 510 using an instrument data model. The instrument data model may be implemented, for example, in XML, JSON, or YAML. An example of a data stored within the instrument data model is shown below:

```
{
    "LISCommunication": {
        "metadata": {
            "senderName": "instrument1",
            "receiverName": "host",
            "dateTime": "20101020091052",
            "messageType": "TSREQ",
            "messageID": "15161",
            "standardVersion": "HL7-2.5",
            "applicationAckPolicy": "Error",
            "characterEncoding": "UNICODE UTF-8"
        },
        "analytical": {
            "query": {
                "queryID": "15161",
                "queryName": "TSREQ",
                "queryPriority": "Routine",
                "queryType": "R1",
                "sample": {
                    "sampleID": "321070",
                    "sampleType": {
                        "name": "S1"
                    },
                    "container": {
                        "containerType": "SC",
                        "rack": {
                            "rackID": "50094",
                            "positionInRack": "2"
                        }
                    }
                }
            }
        }
    }
}
```

The MCM 216 can be further configured, in such examples, to convert the analytical data from the instrument data model into a data model compatible with the communication protocol(s) supported by the LIS 102 and/or MW 104. For example, the above example may be converted into the HL7 protocol:

```
MSH|^~\&|instrument1||host||20101020091052||TSREQ|15161|2.5||||ER||UNICODE UTF-8|
QPD|TSREQ|15161|321070||50094|2||||S1|SC|R1|R|
RCP|I|1|R|
```

Or into the ASTM-LIS2-A2 protocol:

```
H|\^&|15220||instrument1^1.04|||||host|TSREQ|P|1|20101020091706|
Q|1|^~321070^0^50094^2^~S1^SC^R1||ALL|||||||R|O|
L|1|N|
```

As is clear from FIGS. 2-5, the PIM and MCM may be implemented in any one or more of the LIS 102, MW 104, the laboratory instrument 108, or an intermediary device (not shown) connected to both the LIS 102 or MW 104 and the laboratory instrument 108.

Figure 6:
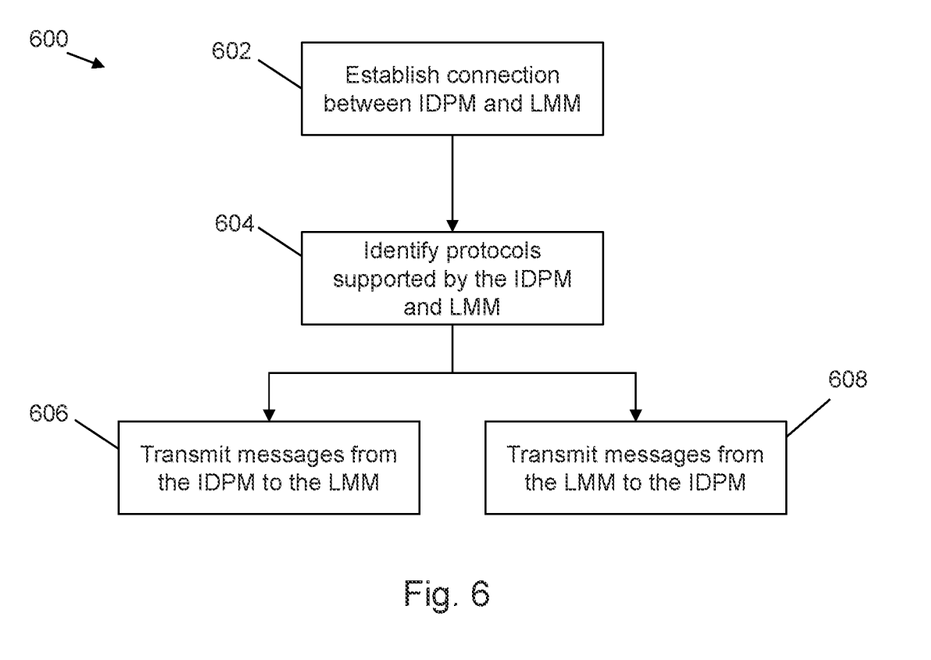
FIG. 6 illustrates a flow diagram of a computer-implemented method according to an embodiment of the present disclosure.

FIG. 6 is a flow diagram of a computer-implemented method 600. In a first step, 602, a connection can be established by a connection module (e.g., the communication module 402 of the laboratory communications engine 400) between the instrument data processing module and the laboratory management module via a computer network. Next, in step 604, an instrument communication protocol supported by the instrument data processing module and a laboratory management module communication protocol supported by the laboratory management module can be identified by the protocol identification module 214.

Next, one or both of steps 606 and 608 can be performed either simultaneously or sequentially. Step 606 includes transmitting, by the communication module, messages from the instrument data processing module (IDPM) to the laboratory management module (LMM) in the instrument communication protocol when it is determined that the instrument communication protocol is the same as or compatible with the laboratory management module communication protocol. Step 608 can include transmitting, by the communication module, messages from the laboratory management module to the instrument data processing module in the laboratory management module communication protocol when it is determined that the laboratory management module communication protocol is the same as or compatible with the instrument communication protocol.

Where a determination can be made that the instrument communication protocol is incompatible with the laboratory management module communication protocol, or vice versa, message conversion may be performed as discussed previously. This message conversion can be achieved through use of the message conversion module 216 discussed above.

The features disclosed in the description, or in the following claims, or in the accompanying drawings, expressed in their specific forms or in terms of performing the disclosed function, or a method or process for obtaining the disclosed results, as appropriate, may, separately, or in any combination of such features, be utilized for realising the invention in diverse forms thereof.

Throughout this specification, including the claims which follow, unless the context requires otherwise, the word "comprise" and "include", and variations such as "comprises", "comprising", and "including" can be understood to imply the inclusion of a stated integer or step or group of integers or steps but not the exclusion of any other integer or step or group of integers or steps.

It may be noted that, as used in the specification and the appended claims, the singular forms "a," "an," and "the" can include plural referents unless the context clearly dictates otherwise.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

I claim:

1. A laboratory system, the laboratory system comprising:
a laboratory instrument;
a laboratory management module configured to receive and process data from the laboratory instrument and to generate one or more messages to be transmitted to an instrument data processing module according to laboratory management module communication protocol(s),
wherein the instrument data processing module is configured to obtain and process analytical data from the laboratory instrument and to generate one or more messages to be transmitted to the laboratory management module according to instrument data processing module communication protocol(s);
a protocol identification module configured to identify compatible communication protocol(s) supported by the laboratory management module and supported by the instrument data processing module; and
a message conversion module configured to automatically convert the or each message to be transmitted from one of the instrument data processing module and the laboratory management module into a compatible communication protocol from the compatible communication protocol(s) supported by the other of the laboratory management module and instrument data processing module when it is determined that either the laboratory management module communication protocol(s) are incompatible with the instrument data processing module communication protocol(s) supported by the instrument data processing module or the instrument data processing module communication protocol(s) are incompatible with the laboratory management module communication protocol(s) supported by the laboratory management module,
wherein the laboratory system is configured to transmit the converted message from the laboratory management module to the instrument data processing module, or from the instrument data processing module to the laboratory management module,
wherein the instrument data processing module is configured, when it is determined that the instrument data processing module communication protocol(s) are supported by the laboratory management module, to transmit its generated message(s) to the laboratory management module according to the instrument data processing communication protocol(s), and/or
wherein the laboratory management module is configured, when it is determined that the laboratory management module communication protocol(s) are supported by the instrument data processing module, to transmit its generated message(s) to the instrument data processing module according to the laboratory management module communication protocol(s).

2. The laboratory system of claim 1, wherein the protocol identification module and the message conversion module are located within the laboratory management module, the laboratory instrument, or an intermediary device connected to both the laboratory management module and the laboratory instrument.

3. The laboratory system of claim 1, wherein the laboratory management module forms a part of a laboratory information system or is middleware connected to a laboratory information system.

4. The laboratory system of claim 1, wherein the instrument data processing module is configured to obtain and process analytical data from the laboratory instrument using an instrument data model,
- wherein the message conversion module is further configured to convert the analytical data from the instrument data model into a data model compatible with the laboratory management module communication protocol(s) supported by the laboratory management module when it is determined that the instrument data model is incompatible with the laboratory management module communication protocol(s) supported by the laboratory management module, and
- wherein the instrument data processing module is configured to transmit the analytical data obtained from the laboratory instrument to the laboratory management module in the instrument data model when it is determined that the instrument data model is supported by the laboratory management module.

5. The laboratory system of claim 1, wherein the laboratory instrument is one of: a pre-analytics instrument, an analyzer, or a post-analytic instrument.

6. The laboratory system of claim 1, wherein the protocol identification module is configured to receive from either of, or both of, the laboratory management module and the instrument data processing module a status indicator which includes an indication of the laboratory management module communication protocol(s), instrument data processing module communication protocol(s), or both.

7. The laboratory system of claim 1, wherein the laboratory management module, the instrument data processing module, or the protocol identification module is configured to send an enquiry message requesting one or both of the laboratory management module or the instrument data processing module reply with an indication of the communication protocol(s) it supports.

8. The laboratory system of claim 1, wherein the message conversion module is configured to convert from the instrument data processing module communication protocol(s) or the laboratory management module communication protocol(s) into any one of: a health level 7 (HL7) protocol; an ASTM-LJS2-A2 protocol; a POCTI-A protocol; or a fast healthcare interoperability resources (FHIR) protocol.

9. The laboratory system of claim 1, wherein the laboratory instrument comprises:
- a user input module, and
- wherein the instrument data processing module is configured to establish a connection to the laboratory management module when prompted to do so via the user input module.

10. A laboratory communications engine, the laboratory communications engine comprising:
- a communication module configured to establish a connection between an instrument data processing module and a laboratory management module via a computer network;
- a protocol identification module configured to identify an instrument data processing module communication protocol supported by the instrument data processing module and a laboratory management module communication protocol supported by the laboratory management module; and
- a message conversion module configured to automatically convert messages to be transmitted from one of the instrument data processing module and the laboratory management module into a communication protocol supported by the other of the laboratory management module and instrument data processing module when it is determined that either the laboratory management module communication protocol supported by the laboratory management module is incompatible with the instrument data processing module communication protocol supported by the instrument data processing module or the instrument data processing module communication protocol supported by the instrument data processing module is incompatible with the laboratory management module communication protocol supported by the laboratory management module, wherein the laboratory system is configured to transmit the converted message from the laboratory management module to the instrument data processing module, or from the instrument data processing module to the laboratory management module,
- wherein the communication module transmits the messages after conversion to one of the instrument data processing module and the laboratory management module,
- wherein the communication module is configured, when it is determined that the instrument data processing module communication protocol is supported by the laboratory management module, to transmit its generated message(s) to the laboratory management module according to the instrument data processing module without conversion, and/or
- wherein the communication module is configured, when it is determined that the laboratory management module communication protocol is supported by the instrument data processing module, to transmit its generated message(s) to the instrument data processing module according to the laboratory management module communication protocol without conversion.

11. The laboratory communications engine of claim 10, wherein the laboratory communications engine is installed within a laboratory instrument, the laboratory management module, or an intermediary device connected to a laboratory instrument and the laboratory management module.

12. The laboratory communications engine of claim 10, wherein the laboratory communications engine is implemented as computer software and is stored in a non-transitory computer readable storage medium containing machine executable instructions which, when executed on a processor, implement the communication module, protocol identification module, and message conversion module.

13. The laboratory communications engine of claim 10, wherein the protocol identification module is configured to receive from either the laboratory management module or the instrument data processing module, or both, a status indicator which includes an indication of one or more communications protocols supported by the laboratory management module, the instrument data processing module, or both.

14. The laboratory communications engine of claim 10, wherein the communication module is configured to send an enquiry message to either the laboratory management module or the instrument data processing module, or both, requesting that it reply with an indication of the communication protocol(s) it supports.

15. A laboratory instrument connectable to a laboratory management module, the laboratory instrument comprising:

an instrument data processing module configured to obtain and process analytical data and to generate messages to be transmitted to the laboratory management module according to an instrument communication protocol;

a protocol identification module configured to identify communication protocol(s) supported by the laboratory management module; and a message conversion module configured to automatically convert any messages to be transmitted to the laboratory management module into a communication protocol supported by the laboratory management module when it is determined that the instrument communication protocol is incompatible with the communication protocol(s) supported by the laboratory management module, wherein the laboratory system is configured to transmit the converted message from the laboratory management module to the instrument data processing module, or from the instrument data processing module to the laboratory management module, and wherein the instrument data processing module is configured to transmit generated messages to the laboratory management module in the instrument communication protocol when it is determined that the instrument communication protocol is the same as or compatible with the communication protocol(s) supported by the laboratory management module.

16. A computer-implemented method, the method comprising:

establishing, by a communication module, a connection between an instrument data processing module and a laboratory management module via a computer network;

identifying, by a protocol identification module, an instrument data processing module communication protocol supported by the instrument data processing module and a laboratory management module communication protocol supported by the laboratory management module; and transmitting, by the communication module, messages from the instrument data processing module to the laboratory management module in the instrument communication protocol when it is determined that the instrument data processing module communication protocol is the same as or compatible with the laboratory management module communication protocol; and/or transmitting, by the communication module, messages from the laboratory management module to the instrument data processing module in the laboratory management module communication protocol when it is determined that the laboratory management module communication protocol is the same as or compatible with the instrument data processing module communication protocol.

17. A non-transitory computer readable storage medium containing machine executable instructions which, when executed on one or more processors, cause the one or more processors to perform the method of claim 16.

\* \* \* \* \*